(12) United States Patent
Psilander et al.

(10) Patent No.: US 11,421,935 B2
(45) Date of Patent: Aug. 23, 2022

(54) FOOD STORAGE APPLIANCE

(71) Applicant: ELECTROLUX APPLIANCES AKTIEBOLAG, Stockholm (SE)

(72) Inventors: Andreas Psilander, Stockholm (SE); Urban Wählby, Stockholm (SE)

(73) Assignee: Electrolux Appliances Aktiebolag, Stockholm (SE)

( * ) Notice: Subject to any disclaimer, the term of this patent is extended or adjusted under 35 U.S.C. 154(b) by 148 days.

(21) Appl. No.: 16/650,524

(22) PCT Filed: Sep. 28, 2017

(86) PCT No.: PCT/EP2017/074640
§ 371 (c)(1),
(2) Date: Mar. 25, 2020

(87) PCT Pub. No.: WO2019/063080
PCT Pub. Date: Apr. 4, 2019

(65) Prior Publication Data
US 2020/0318901 A1 Oct. 8, 2020

(51) Int. Cl.
| | | |
|---|---|---|
| *B01D 53/00* | (2006.01) | |
| *F26B 9/00* | (2006.01) | |
| *A23L 3/40* | (2006.01) | |
| *B01D 53/04* | (2006.01) | |
| *B01D 53/26* | (2006.01) | |
| *F25D 17/04* | (2006.01) | |
| *F25D 25/02* | (2006.01) | |

(52) U.S. Cl.
CPC .............. *F26B 9/00* (2013.01); *A23L 3/40* (2013.01); *B01D 53/0438* (2013.01); *B01D 53/0446* (2013.01); *B01D 53/261* (2013.01); *F25D 17/042* (2013.01); *F25D 25/025* (2013.01); *A23V 2002/00* (2013.01);
(Continued)

(58) Field of Classification Search
CPC ..... C01C 1/0458; A23L 3/40; B01D 2257/80; B01D 2259/40088; B01D 53/0438; B01D 53/0446; B01D 53/261; F25D 17/042; F25D 2317/0411; F25D 25/025
See application file for complete search history.

(56) References Cited

U.S. PATENT DOCUMENTS

| | | |
|---|---|---|
| 2,411,039 A | 11/1946 | Heuser |
| 2,511,666 A | 6/1950 | Barr |

(Continued)

FOREIGN PATENT DOCUMENTS

| | | |
|---|---|---|
| CN | 102483282 | 5/2012 |
| CN | 203798081 | 8/2014 |

(Continued)

OTHER PUBLICATIONS

International Search Report for PCT/EP2017/074640, dated May 25, 2018, 3 pages.
(Continued)

*Primary Examiner* — Sharon Pregler
(74) *Attorney, Agent, or Firm* — Pearne & Gordon LLP (57) ABSTRACT

The invention relates to a box (10) for preservation of food. The box comprises a food storage compartment (16). The box also comprises a dry unit (20) adapted to dry the air inside the food storage compartment. The sealable box is formed as one stand-alone unit. Hereby an appliance for keeping food at dry conditions is provided. The appliance can be easily installed and can be moved around to any suitable location including inside a kitchen cabinet.

16 Claims, 6 Drawing Sheets

(52) U.S. Cl.
CPC .................... *B01D 2257/80* (2013.01); *B01D 2259/40088* (2013.01); *F25D 2317/0411* (2013.01); *F26B 2210/00* (2013.01)

(56) References Cited

U.S. PATENT DOCUMENTS

| | | | |
|---|---|---|---|
| 5,617,648 A | | 4/1997 | Leisinger |
| 2016/0360773 A1* | | 12/2016 | Pan ...................... A23B 7/0205 |

FOREIGN PATENT DOCUMENTS

| | | |
|---|---|---|
| CN | 107131698 | 9/2017 |
| DE | 102007038354 | 2/2009 |
| JP | 0771865 | 3/1995 |
| JP | 11325705 | 11/1999 |
| WO | 2014137039 | 9/2014 |
| WO | 2015018218 | 2/2015 |

OTHER PUBLICATIONS

Brazilian OA for application No. BR112020004954-9, dated Nov. 4, 2021, 6 pages.
Chinese OA for application No. 201780095113.6, dated Jan. 17, 2022, 13 pages.
European Communication for application No. 17 777 038.5, dated Jul. 4, 2022, 5 pages.

* cited by examiner

FOOD STORAGE APPLIANCE

TECHNICAL FIELD

The invention relates to an appliance for storing food. In particular the invention relates to a box for storing food in a controlled environment.

BACKGROUND

When preserving food, the food to be preserved can be placed in a container having a controlled environment. For example, a refrigerator can be used to keep food cold or a freezer can be used to keep food frozen.

There is a constant desire to improve storage and preservation of food. Hence there exists a need for an improved device for preserve food.

SUMMARY

It is an object of the present invention is to provide a device for preservation of food.

This object is obtained by a box for food preservation as set out in the appended claims.

In accordance with the invention, a box for preservation of food is provided. The box comprises a food storage compartment. The box also comprises a dry unit adapted to dry the air inside the food storage compartment. The sealable box is formed as one stand-alone unit. Hereby an appliance for keeping food at dry conditions is provided. The appliance can be easily installed and can be moved around to any suitable location including inside a kitchen cabinet.

In accordance with one embodiment, the sealable box comprises a drawer adapted to access the interior of the food storage compartment. Hereby a mechanism that makes it easy to access the inside of the box where food is to be stored is to be provided. Further, the provision of a drawer makes it easy to install the box in a kitchen cabinet.

In accordance with one embodiment, the dry unit is configured to keep the humidity level in the box at a pre-determined value or within a pre-set range. Hereby, the humidity inside the box can be kept at a desired level so that the food stored in the box can be preserved at the best possible conditions.

In accordance with one embodiment, the dry unit is configured set the humidity level in response to the type of food to be stored in the food storage compartment. Hereby, the humidity can be adapted to fit with the type of food stored inside the box. This is based on the insight that not all food requires the same level of humidity to be optimally stored. Thus, depending on the type of food a different level of humidity can be set.

In accordance with one embodiment, the dry unit comprises an absorber and a fan to drive air through the absorber. Hereby, an efficient mechanism for removing humidity from the air inside the box can be provided.

In accordance with one embodiment the absorber is configured to be heated by a heater to regenerate the absorber. Hereby, the absorber can be re-generated without having to remove absorber or replace the absorber and the box can be used with a small need for maintenance.

In accordance with one embodiment, the dry unit comprises a set of valves to control the air flow within the dry unit to be switched between a number of operational modes of the dry unit. By proving valves, in particular two-way valves can be used.

In accordance with one embodiment one mode of operation of the dry unit is a dry mode wherein air is circulated from the dry unit via the food storage compartment to absorb humid air in the absorber. Hereby, a mode for effective drying of air inside the box can be provided.

In accordance with one embodiment, one mode of operation of the dry unit is a regeneration mode wherein air is circulated from the dry unit via the outside of the box to release water from the absorber outside of the box. Hereby an efficient mode for regenerating the absorber is provided.

In accordance with one embodiment, one mode of operation of the dry unit is an idle mode wherein air is not circulated in the dry unit and wherein the dry unit is configured to seal air from entering the food storage compartment via the dry unit. Hereby a mode is provided that can be used when there is no need to dry the air inside the box or a need to regenerate the absorber is provided. This mode is useful for saving energy consumption in the box, because the fan can be turned off in the idle mode.

In accordance with one embodiment, the food storage compartment and the dry unit are configured in direct contact with each other. Hereby, the box can be made compact and the need for providing pipes or similar to connect the dry unit to the food storage compartment can be removed.

The invention also relates to a kitchen cabinet comprising a box for preservation of food as set out herein.

BRIEF DESCRIPTION OF THE DRAWINGS

The invention will now be described in more detail, by way of example, and with reference to the accompanying drawings, in which.

DETAILED DESCRIPTION

The invention will now be described more fully hereinafter with reference to the accompanying drawings, in which certain embodiments of the invention are shown. The invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

As has been realized, it would be good to provide an appliance for food preservation that enables keeping food in a controlled humidity. This would be particularly advantageous in locations with high humidity and where the food to be preserved is sensitive to high humidity. To provide such an appliance a sealable box having a controlled humidity can be provided. The appliance can advantageously be a stand-alone unit that is then easy to install or can even be moved from place to place to be used wherever needed.

Figure 1:
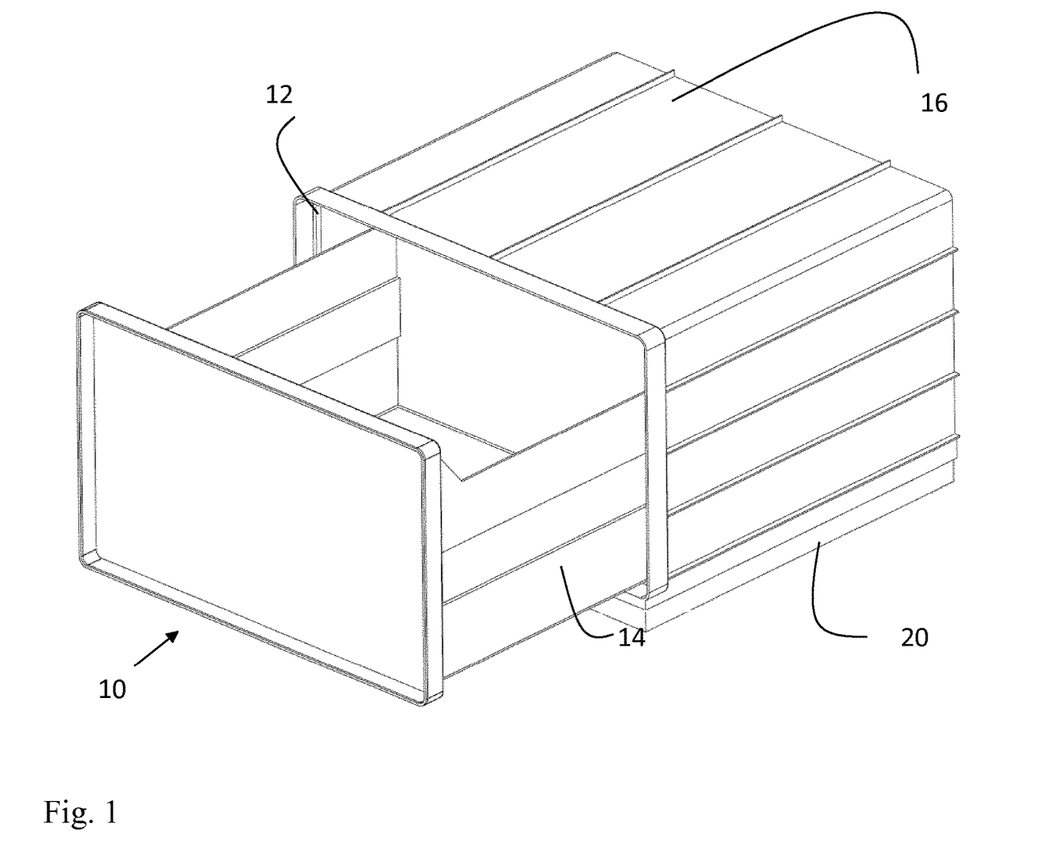
FIG. 1 shows a sealable box for food preservation.

FIG. 1 schematically shows a sealable box to for food preservation. The box to comprises an air tight seal 12 for sealing the inside of the box to from air outside of the box to when the box is in a closed position. The box to comprises a food storage compartment 16 wherein food to be kept in dry conditions can be stored. In the embodiment shown in FIG. 1, the box to comprises a drawer 14 that can serve as an opening to the box to to access the food storage compartment 16. The box to can be closed by pushing the drawer 14 into a closed position to seal the box to. However, the invention is not limited to such an embodiment with a drawer 14 to access the interior of the food storage compartment 16. The box to could for example be formed by a box with a removable lid that could be placed on top of the box. Other ways of constructing a box that can be placed in a closed, air-tight position are also envisaged.

When the box is in an open position, food can be placed in the box 10. When the box 10 is closed. The environment inside the box is controlled by a dry unit 20 of the box 10 to keep the humidity inside the box at a pre-determined level or within a pre-set range as will now be explained in more detail.

Figure 2:
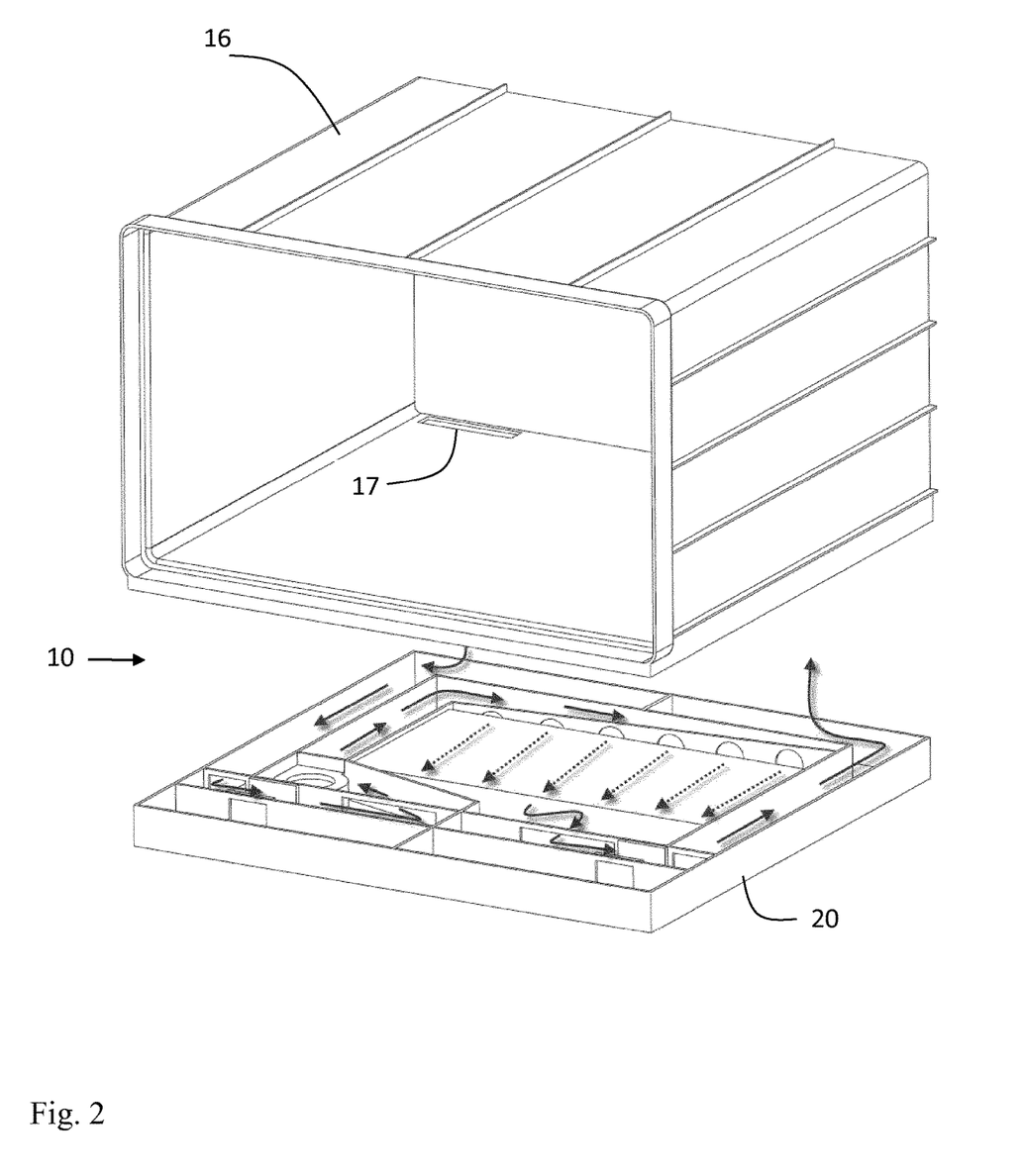
FIG. 2 shows a sealable box with a dry unit illustrated in more detail.

In FIG. 2, a view illustrating the box 10 with the drawer 14 removed for ease of showing the operation of the box 10 is shown. As is shown in FIG. 2, the box 10 comprises at least one air inlet 17 and at least one air outlet 18 (see FIG. 5) from the food storage compartment 16 to the dry unit 20. Air is circulated in the box 10 by a dry unit 20. The dry unit 20 keeps the humidity in the box 10 at a controlled level. The humidity level can be pre-set and controlled by a user to be adapted to different types of food.

The dry unit 20 can advantageously be fitted in direct connection with the box 10 so that circulated air does not have to be led via pipes to the box 10. It is preferred that the dry unit 20 is located directly beneath the box 10 when the box is in an operational position or directly on top of the box 10 when the box is in an operational position. However, it is also envisaged that the dry unit 20 could be located on a side or at the back of the box 10 when the box 10 is in an operational position. The size of the dry unit 20 can be made to fit with the size of the box and is advantageously made thin so that the dry unit can have generally the size of the side of the box 10 where it is placed but much thinner than wide. For example, the dry unit can have a thickness (height) of about 1-5 cm, such as 3-4 cm. On the other hand, the width and depth of the dry unit 20 can be significantly larger (in the order of tenths of cm such as 50×50 cm) than the height of the dry unit 20. That is one side of the dry unit 20 will be about a tenth of the length or less of the other sides of the dry unit where the dry unit is generally box shaped. Hereby the dry unit 20 can be formed to not occupy space that would interfere with a box shape of the food storage compartment (16). In other words, the food storage compartment (16) can be box shaped without the dry unit taking a lot of space. This results in that the stand-alone box to, can be made compact and as a whole does not become unnecessary bulky.

Figure 3:
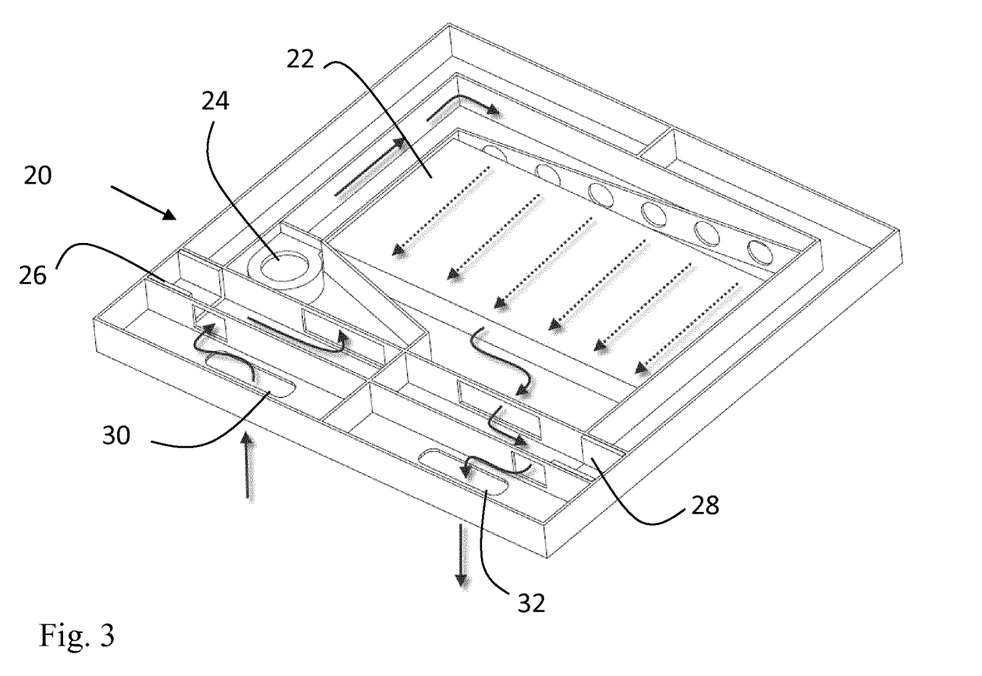
FIG. 3 shows a dry unit operating in a regenerating mode.
Figure 4:
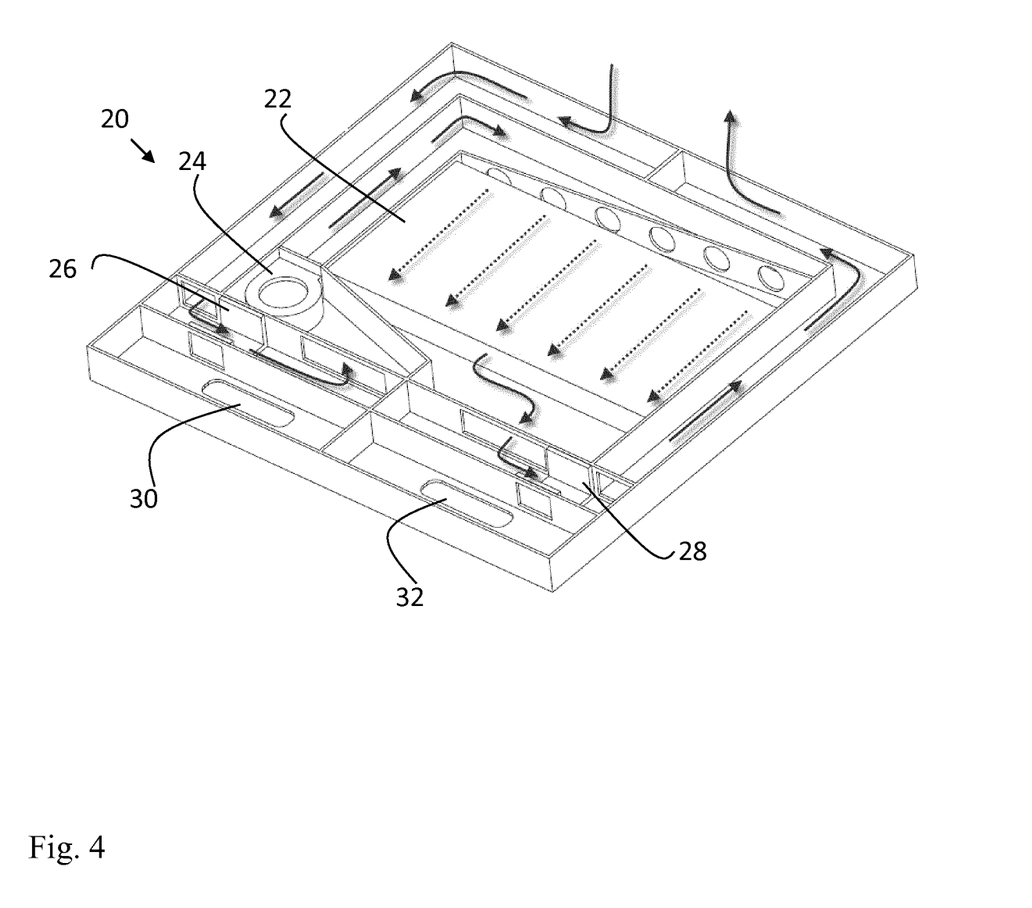
FIG. 4 shows a dry unit operating in a drying mode.

In FIGS. 3 and 4, the working of the dry unit 20 is described in more detail. Generally, the dry unit 20 comprises an absorber 22 than can be heated by a heater. The dry unit further comprises a fan 24 to drive an air-flow through the dry unit 20. The air-flow is indicated by the arrows in the Figures. Also, valves 26, 28 are provided to switch the operational mode for the dry unit 20 as will be described below. The valves can be two-way valves configured to switch the air-flow inside the dry unit 20.

In FIG. 3, the dry unit is in an operational mode where the absorber 22 is heated by the heater to re-generate the absorber 22. In this regeneration mode, the fan is turned on to drive an air-flow through the dry unit 20. The valves 26, 28 are placed in a position to drive the air-flow from outside the box to via an outside inlet 30 via the heated absorber 22 and out to outside the box to via an outside outlet 32. The food storage compartment 16 is then sealed by the valves 26, 28 so that no outside air can enter the food storage compartment 16 via the dry unit 20. Thus, the heater will heat the absorber 22. The absorber 22 will then release water absorbed by the absorber to the air. The air carrying the water from the absorber will then be circulated to outside of the box to.

In FIG. 4, the dry unit 20 is in an operational mode where the absorber 22 is absorbing humid air from the air inside the food storage compartment 16 to dry the air in the food storage compartment 16. In this drying mode, the fan is turned on to drive an air-flow through the dry unit 20. The valves 26, 28 are placed in a position to drive the air-flow from inside the food storage compartment 16. The air is drawn via the inlet 17 from the food storage compartment 16 via the heated absorber 22 to dry the air and back to the food storage compartment 16 via the outlet 18 (see FIG. 5).

Figure 5:
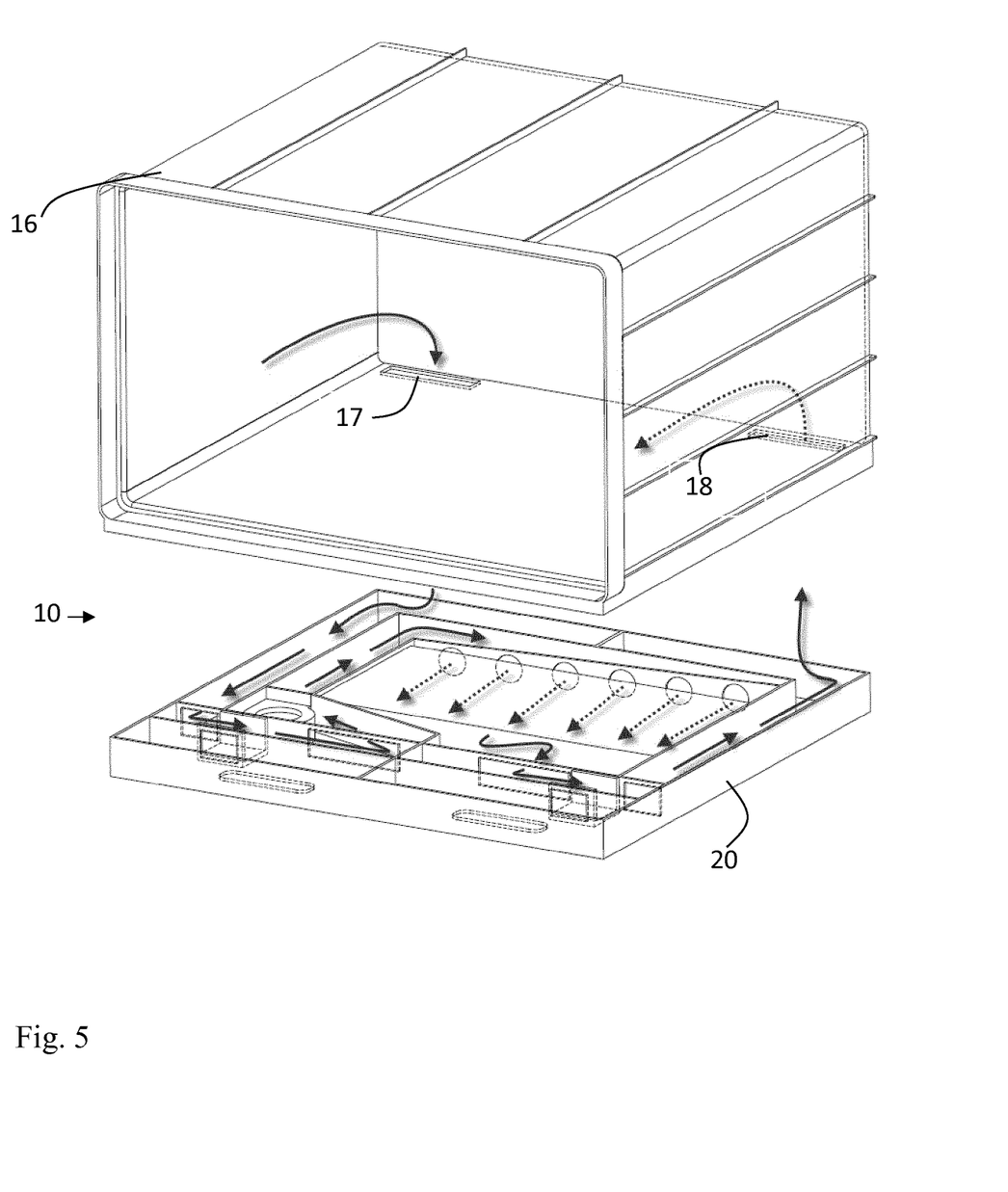
FIG. 5 shows the dry unit together with a food storage compartment when operating in a drying mode.

In FIG. 5, the dry unit 20 is shown together with the food storage compartment 16 and showing the air-circulation in the food storage compartment 16 when the dry unit 20 is in a drying mode. In this drying mode air is circulated through the food storage compartment 16 via the inlet 17 and outlet 18 to be dried by the dry unit 20.

The dry unit 20 can also be in a third mode of operation that can be termed an idle mode. In this idle mode air is not circulated to regenerate the absorber 22 as in the regeneration mode or to dry the air in the food storage compartment 16 as in the drying mode. Instead, in the idle mode air is not circulated by turning of the fan 24. Also, in the idle mode, the valves can be in a position to keep the food storage compartment 16 sealed from the outside so that no outside air can enter the food storage compartment 16 via the dry unit. This idle mode is useful for saving energy consumption in the box, because the fan can be turned off in the idle mode.

Figure 6:
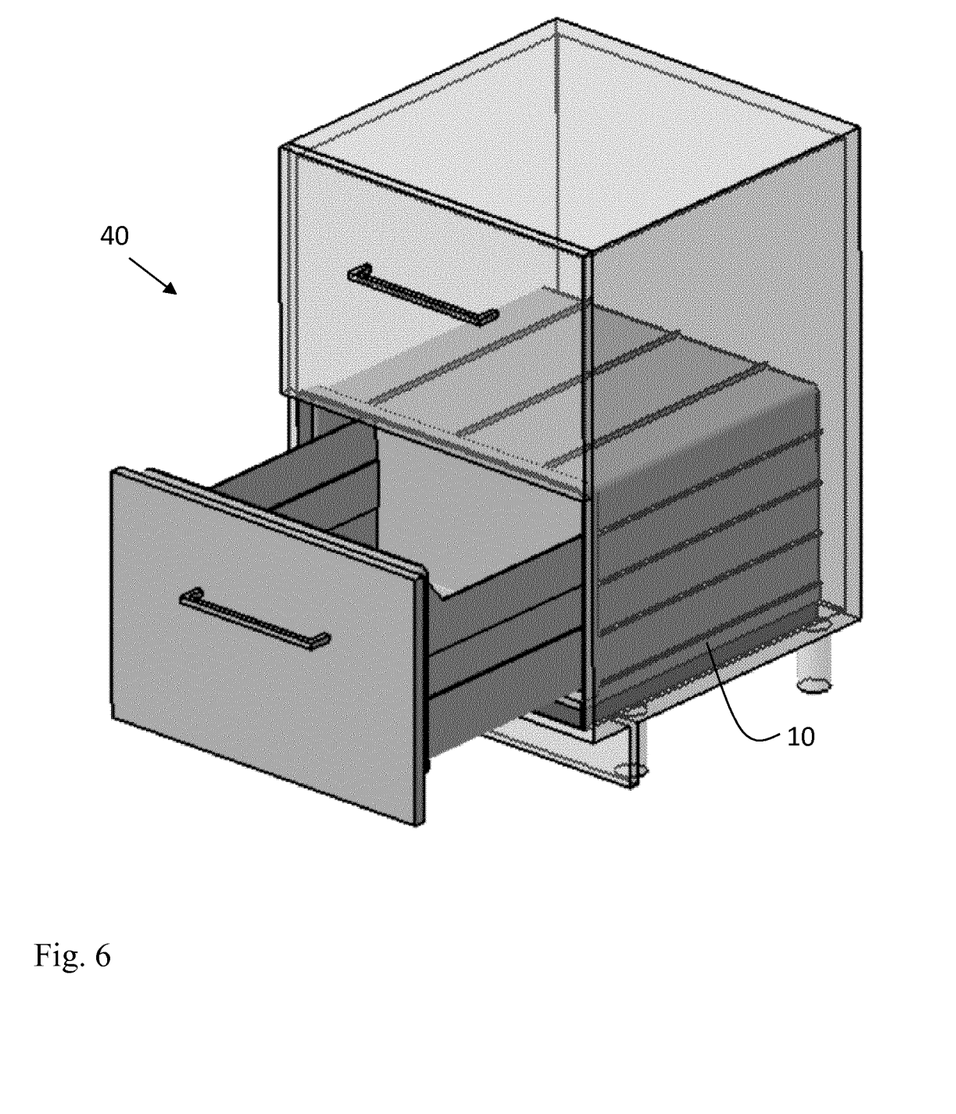
FIG. 6 shows a sealable box placed in a kitchen cabinet.

The box to as described herein can be made in a suitable size so that the outer dimensions can fit in a standard kitchen. In FIG. 6 a cabinet 40 comprising a box to as described herein is shown. By selecting the dimensions of the box to to a standard kitchen it is possible to fit the box to inside a standard cabinet 40 of a kitchen. Because the box to can be a stand-alone unit, it is easy to install in a kitchen and it can also be used outside a cabinet of a kitchen and be put on a table, a shelf or a cupboard in the same manner as a microwave own or a table top dishwasher is used.

Further, because the dry unit of the box can be made very slim with a thickness of less than 5 cm, the dry unit is easy to fit to work with the food storage compartment.

The invention has been described above with reference to a few embodiments. However, as is readily appreciated by a person skilled in the art, other embodiments than the ones disclosed above are equally possible within the scope of the invention, as defined by the appended claims.

The invention claimed is:

1. A sealable box for preservation of food, the sealable box comprising:
  a food storage compartment; and
  a dry unit disposed outside of the food storage compartment and configured to dry humid air inside the food storage compartment, wherein the sealable box is formed as one stand-alone unit, and wherein the dry unit comprises an absorber and a fan, the fan configured to drive an air flow through the absorber, and the absorber configured to absorb said humid air.

2. The sealable box according to claim 1, further comprising a drawer adapted to access the interior of the food storage compartment.

3. The sealable box according to claim 1, wherein the dry unit is configured to keep a humidity level in the sealable box at a pre-determined value or within a pre-set range.

4. The sealable box according to claim 3, wherein the dry unit is configured set the humidity level in response to a type of food to be stored in the food storage compartment.

5. The sealable box according to claim 1, wherein the absorber is configured to be heated by a heater to regenerate the absorber.

6. The sealable box according to claim 1, wherein the dry unit comprises a set of valves to control the air flow within the dry unit to be switched between a number of operational modes of the dry unit.

7. The sealable box according to claim 6, wherein one mode of operation of the dry unit is a dry mode wherein air is circulated from the dry unit via the food storage compartment to absorb the humid air in the absorber.

8. The sealable box according to claim 6, wherein one mode of operation of the dry unit is a regeneration mode wherein air is circulated from the dry unit via the outside of the box to release water from the absorber outside of the box.

9. The sealable box according to claim 6, wherein one mode of operation of the dry unit is an idle mode wherein air is not circulated in the dry unit and wherein the dry unit is configured to seal air from entering the food storage compartment via the dry unit.

10. The sealable box according to claim 1, wherein the food storage compartment and the dry unit are configured in direct contact with each other.

11. A kitchen cabinet comprising the sealable box according to claim 1.

12. The sealable box according to claim 1, wherein the absorber is disposed fluidly downstream from the fan.

13. The sealable box according to claim 1, wherein the dry unit has a height between 1-5 cm.

14. The sealable box according to claim 1, the dry unit further comprising a set of valves to control the air flow therein, the set of valves being movable between first and second operational positions,
wherein in the first operational position, the air flow is circulated between the dry unit and the food storage compartment such that the humid air is absorbed by the absorber, and
wherein in the second operational position, the absorber is in fluid communication with air outside of the sealable box.

15. The sealable box according to claim 14, wherein in the first position, the food storage compartment is fluidly isolated from the air outside of the sealable box.

16. The sealable box according to claim 15, wherein in the second position, the absorber is fluidly isolated from the food storage compartment.

* * * * *